Feb. 12, 1952      H. R. TEAR      2,585,189
PUMPING MECHANISM FOR CENTRALIZED LUBRICATING SYSTEMS
Filed Sept. 30, 1946      3 Sheets-Sheet 1

Inventor:
Harry R. Tear

Feb. 12, 1952     H. R. TEAR     2,585,189
PUMPING MECHANISM FOR CENTRALIZED LUBRICATING SYSTEMS
Filed Sept. 30, 1946     3 Sheets-Sheet 2
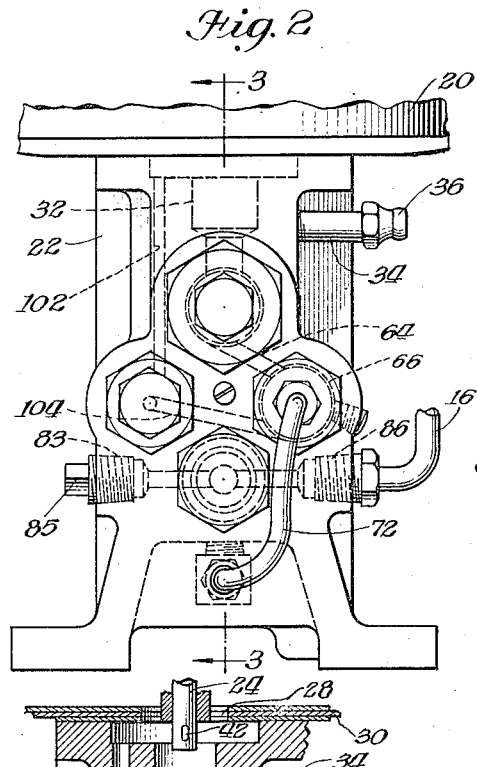
Fig. 2
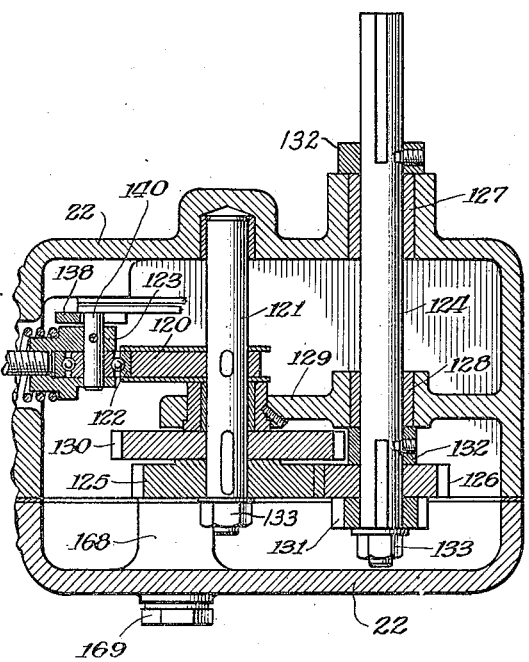
Fig. 4
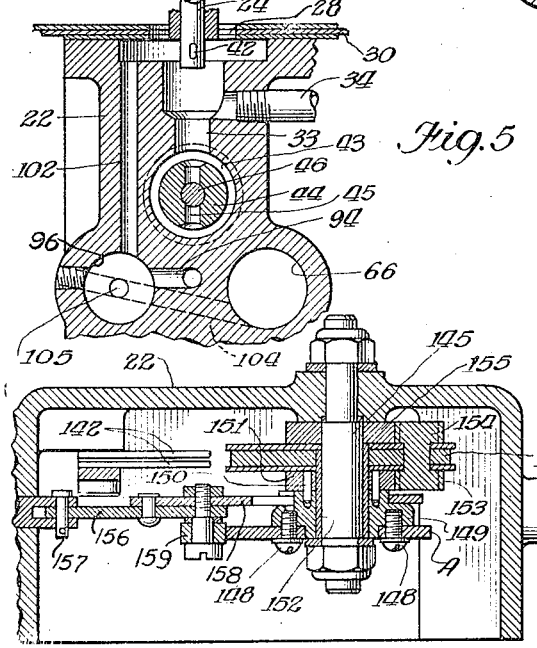
Fig. 5
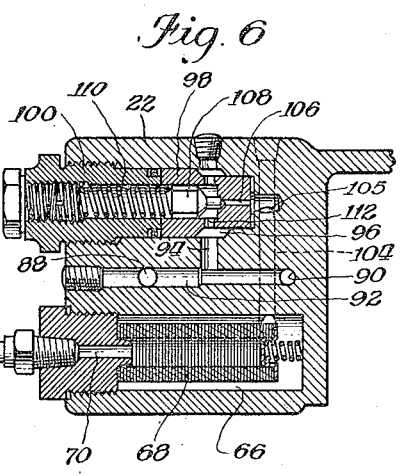
Fig. 6
Fig. 7
Inventor:
Harry R. Tear
By: Hinkle, Horton, Ahlberg, Heinemann & Nappier
Attorneys

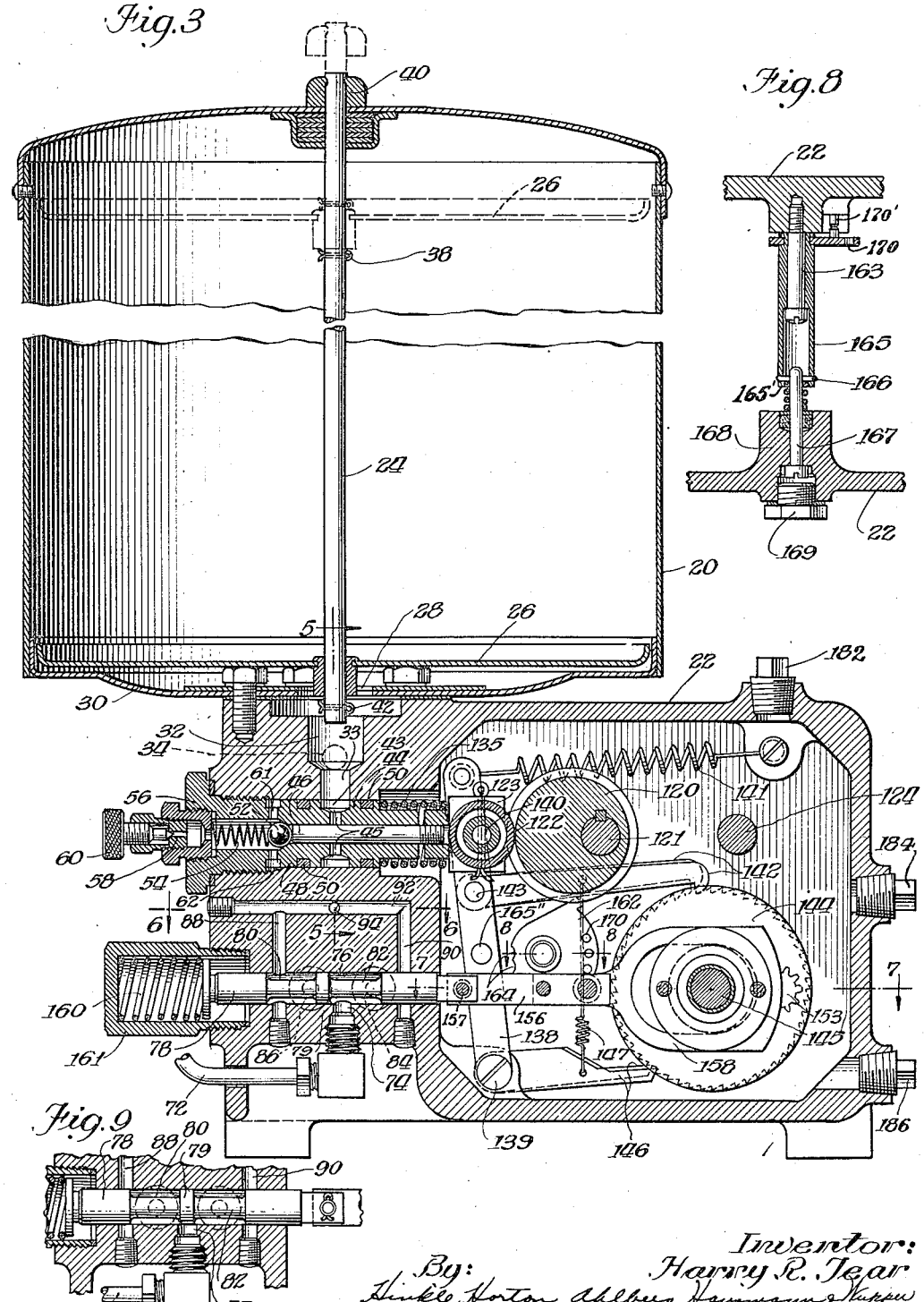

Patented Feb. 12, 1952

2,585,189

UNITED STATES PATENT OFFICE 2,585,189

PUMPING MECHANISM FOR CENTRALIZED LUBRICATING SYSTEMS

Harry R. Tear, Evanston, Ill., assignor to Stewart-Warner Corporation, Chicago, Ill., a corporation of Virginia Application September 30, 1946, Serial No. 700,224

17 Claims. (Cl. 184—7)

This invention relates to lubricating apparatus and more particularly to automatic centralized systems for lubricating a plurality of bearings or other surfaces at predetermined intervals and with measured quantities of lubricant.

One object of the invention is to provide a new and improved pumping mechanism for a centralized lubricating system.

Another object of the invention is to provide a new and improved unit embodying pumping mechanism and valve control mechanism for use with a lubricating system of the dual line type.

It is also an object of the invention to provide a power driven pumping mechanism for a centralized lubricating system and means for varying the rate of operation of the pump.

A further object of the invention is to provide a control unit combined with a pump unit for use in a dual line lubricating system in which lubricant is fed first in one direction through the system and then in the other direction, said control unit including valve mechanism for feeding the lubricant selectively into one end or into the other end of the system, and a timing device actuated by operation of the pump for shifting the valve mechanism after a predetermined period of flow in one direction.

Other objects and advantages will appear from the following description taken in connection with the drawings, in which:

Fig. 2 is an end elevation of the unit shown in Fig. 1;

Fig. 3 is a vertical sectional view taken substantially as indicated at line 3—3 on Fig. 2 and including the upper portion of the reservoir;

Fig. 4 is a horizontal section taken substantially as indicated at line 4—4 on Fig. 1;

Fig. 5 is a fragmentary vertical section taken as indicated at line 5—5 on Fig. 3, and with certain parts omitted;

Fig. 6 is a horizontal detail section taken as indicated at line 6—6 on Fig. 3;

Fig. 7 is a fragmentary horizontal section taken as indicated at line 7—7 on Fig. 3;

Fig. 8 is a fragmentary detail section taken as indicated at line 8—8 on Fig. 3;

Fig. 9 is a fragmentary vertical section taken at the same plane as Fig. 3, but showing the valve in a different position.

Figure 1:
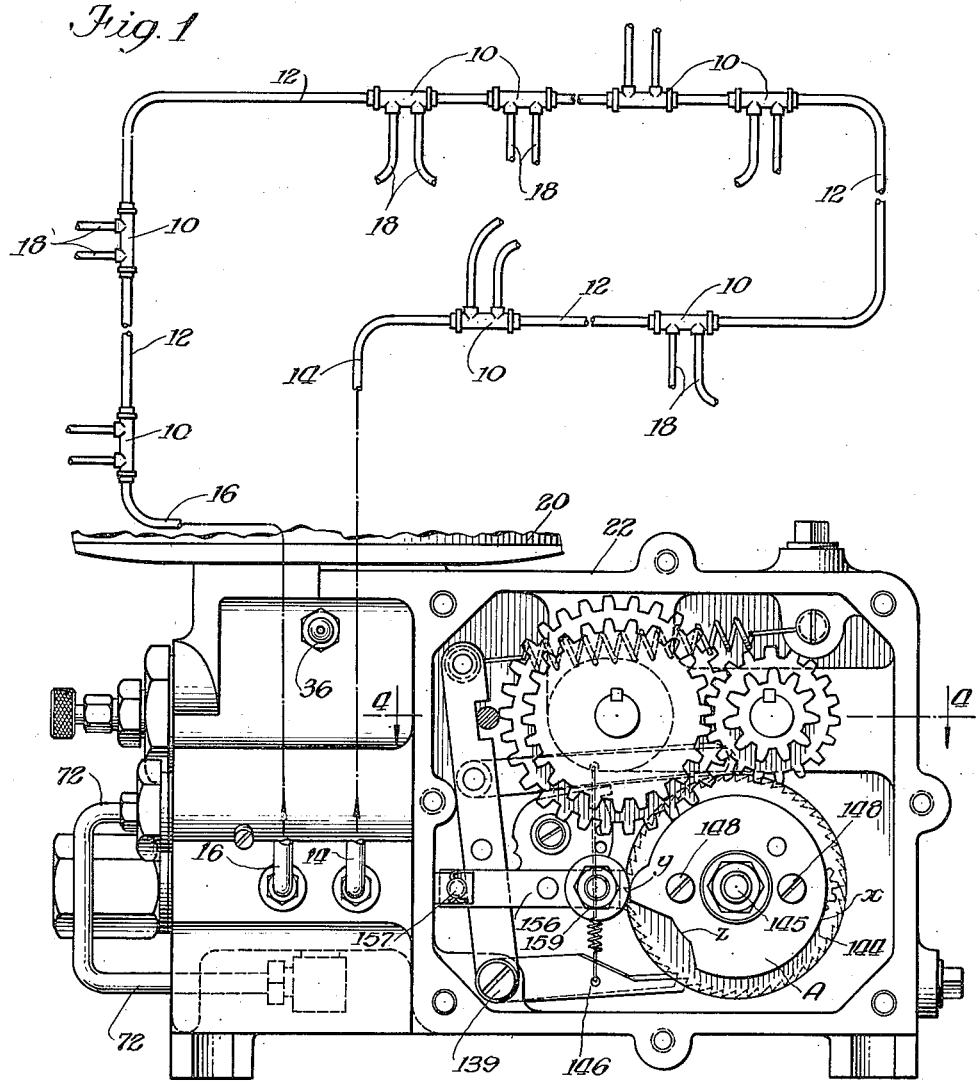
Fig. 1 is a side elevational view of a pumping and control unit embodying this invention together with a diagrammatic view of a dual line lubrication system adapted to be supplied and actuated thereby, the unit being shown with its cover removed.

As shown in Fig. 1 a dual line lubricating system usually consists of a plurality of measuring valve devices 10 connected in a continuous series by sections of conduit 12 with terminal sections of conduits 14 and 16 leading from a source of supply of lubricant under pressure. Each measuring device 10 includes two outlet tubes 18, both of which may lead to a single bearing if it is a large one or which may lead to separate bearings requiring smaller quantities of lubricant. When the lubricant is fed under pressure into the conduit 14 the mechanism of each of the valves 10 is actuated for delivering a charge of lubricant through one of its outlet tubes 18. Any excess flow is returned to the supply through the conduit 16. The flow is then reversed and lubricant is fed under pressure into the conduit 16 and through the several measuring valves 10, each of which then discharges lubricant from its other outlet 18 while the excess flow is returned to the supply through the conduit 14. This concludes the cycle of operation and usually the cycle is repeated at predetermined intervals of time under control of any suitable timing mechanism. The present invention provides mechanical means for shifting a control valve so that the lubricant is first fed to the system through the conduit 14 and is then fed in the reverse direction to complete the cycle.

As shown in Fig. 3 a reservoir 20 for a supply of lubricant surmounts the housing 22 which encloses the mechanism of the pumping and control unit. The reservoir 20 is shown as a tank having an axially disposed guide rod 24 on which there is slidably mounted a follower disc 26. An opening 28 in the bottom wall 30 communicates with a passage 32 in the upper portion of the housing 22 and a filling nipple 34 communicates laterally with the passage 32 and is provided with a terminal 36 for attachment to a hose or grease gun through which lubricant may be forcibly fed into the reservoir through the opening 28 in its bottom wall. As the reservoir is thus filled the follower plate 26 rises therein on the surface of the lubricant, and as it approaches the top of the reservoir it engages a cross pin 38 in the guide rod 24 and lifts the rod through a limited distance so that its terminal 40 is raised above the top of the reservoir as a signal to indicate that the reservoir is full. A cross pin 42 in the lower end of the guide rod 24 prevents removal of the rod except when the cover of the reservoir 20 is intentionally removed for cleaning or repairing the interior.

The pumping mechanism includes a cylinder 44 preferably made of high carbon steel which can be accurately machined and lapped to receive its piston 46. The cylinder is fitted in a bore 48 formed in the cast housing 22 and may be provided with packing rings 50 to secure the cylinder in leakproof relation therein. One end of the cylinder bore is closed by a ball check valve 52 having a spring 54 pocketed in the threaded terminal portion 56 of the cylinder, and said portion may be provided with an air vent 58 controllable at will by a needle valve 60 and normally closed. The terminal portion 56 of the cylinder has ports 61 leading from points adjacent the check valve and said ports open into an annular passage 62 from which a duct 64 leads obliquely into a cylindrical pocket 66, as seen in Fig. 2. A screen or filter element 68 is mounted in the pocket and provides access therefrom to a feed port 70 which is connected by a tube 72 with a port 74 disposed in the underside of a valve chamber 7. Said chamber is a cylindrical bore in which there is slidably mounted a cylindrical valve member 78 having reduced portions 80 and 82 which form annular passages for connecting certain ports to control the flow of lubricant as desired.

As seen in Figs. 2 and 3 there are two outlets 84 and 86 from which the conduits 14 and 16 lead respectively. These outlets are horizontally aligned with the axis of the valve chamber 76 and open into said chamber; and preferably said outlets are duplicated on the opposite side of the housing, one of them being shown at 83 in Fig. 2. This is simply as a matter of convenience so that the conduits 14 and 16 leading to the series of measuring valves may be coupled to the pump and control unit at either side. The unused outlets are closed with threaded plugs 85.

In addition to the outlets 84 and 86 the cast body of the housing 22 contains vent or return passages 88 and 90 which are connected together by a passage 92. As shown in Fig. 6, a short lateral passage 94 leads from the passage 92 into an annular space 96 which is formed in a bore in the casing by the insertion of a relief valve fitting 98 in the bore, said fitting being secured in place by a threaded plug 100. From the annular space 96 Fig. 5 shows a passage 102 leading vertically past the pump cylinder and opening into the space just below the port 28 in the bottom wall 30 of the reservoir 20. Thus a return path is provided for any excess lubricant pumped into the system in either direction.

If at any time the filter screen 68 should become seriously clogged so as to impede the flow of lubricant from the pump into the system, the lubricant entering the pocket or chamber 66 will fill a cross passage 104, shown in dotted lines in Figs. 5 and 6. This passage leads to a short passage 105 and into a port 106 which is normally closed by the valve member 108 seated by the spring 110 in the plug 100; but the back pressure will open the valve and the lubricant can then return to the reservoir through the passage 102.

With the valve member 78 positioned as shown in Fig. 3, it will be seen that as the piston 46 of the pump is moved to the right in its cylinder 44, it will be withdrawn to uncover inlet ports 45 connecting with the annular passage 43 which is formed in the cylinder 44. This passage communicates with the extension 33 of the passage 32 leading from the reservoir 20, thus admitting lubricant into the unoccupied portion of the bore of the cylinder 44. Upon its return stroke the piston 46 will force this lubricant past the check valve 52 through ports 61 into the annular passage 62 and through the inclined duct 64 to the screen chamber or pocket 66. Passing through the screen 68 the lubricant will flow through the port 70, tube 72, and discharge port 74 into the annular space provided by the reduced portion 82 of the valve 78 and thence through the outlet port 84 to which the conduit 14 is connected. At the same time, with the valve member 78 in this position, the conduit 16 serves as a return passage from the system connecting the port 86 which leads to the space provided by the reduced portion 80 of the valve 78 and thence through the return or vent passage 88, passages 92, 94 and 96 and the passage 102 through which the excess lubricant is returned to the reservoir 20.

When the valve 78 is shifted from the left-hand limit of its travel, as seen in Fig. 3, to its right-hand limit of movement the reduced portion 80 of the valve will register with the feed port 74, providing communication between said port and the outlet port 86 to which conduit 16 is connected. This will cause the lubricant to flow in the opposite direction around the system of tubes 12 and valves 10, returning by way of the conduit 14 and port 84. With the valve 78 in this latter position the port 84 will be connected with the return passage 90 leading back to the reservoir through passages 92, 94, 96 and 102.

When the valve 78 is adjusted to an intermediate position, as shown in Fig. 9, its middle portion or land 79, being narrower than the feed port 74 will not fully close said port and its end portions will not fully close the return passages 88 and 90; therefore the pump will merely pass lubricant from the feed port 74 into passages 88 and 90, and back to the reservoir 20 through the return passages 92, 94, 96 and 102. In the present apparatus it is contemplated that the pump shall run continuously, thus feeding the lubricant in the closed path just described except at predetermined intervals when it is fed into the system for actuating the measuring valves 10 and lubricating the bearings served by them.

To accomplish this result a timing mechanism is operated mechanically in connection with the operation of the pump itself. The pump is driven by an eccentric 120 keyed to a shaft 121 and operating against a roller 122 journaled on ball bearings in a crosshead 123 secured to the end of the piston 46. As shown in Fig. 4, the shaft 121 is connected to a drive shaft 124 by a gear 125 meshing with a pinion 126 on the drive shaft. Said drive shaft extends outside the casing 22 and may be fitted with a pulley, gear or coupling means connecting it with any convenient moving part of the machine to be lubricated, or with a separate motor or other source of power. Said shaft 124 is journaled in a bearing 127 formed in one wall of the casing 22 and in the second bearing 128 supported by a web or partition 129 within the casing. To provide for a different speed ratio between the shafts 124 and 121 a second gear 130 is carried on the shaft 121 alongside the gear 125, and a second pinion 131 is associated with the pinion 126 on the shaft 124. The shaft 124 is held in place by collars 132. Upon removal of the securing nuts 133 from the ends of the shafts 121 and 124, the gears 125 and 130 may be removed and transposed and the pinions 126 and 131 may be similarly removed and transposed so that the pinion 131 meshes with the gear 130. Two more speed ratios may be secured by placing gears 125 and 130 on the shaft 124 and placing pinions 126 and 131 on the shaft 121, either with gear 125 and pinion 126 in mesh or with gear 130 and pinion 131 in mesh.

As the eccentric 120 rotates, the roller 122 is held in contact with the eccentric by a spring 135 reacting between a shoulder on the cylinder 44 and a shoulder on the crosshead 123. The resulting reciprocation of the piston 46 and the crosshead 123 actuates the lever 138 fulcrumed in the casing 22 at 139, said lever 138 being engaged by the pin 140 which serves to secure the roller 122 and its ball bearing in the crosshead and projects laterally therefrom, as seen in Fig. 4. A spring 141 urges the lever 138 yieldingly in one direction for contact with the pin 140. A pair of ratchet dogs 142 are connected to the lever 138 by a pivot 143 and the teeth of said dogs are offset from each other by half the width of one tooth of a ratchet wheel 144 rotatably mounted on the stub shaft 145 which is fixedly secured in the casing 22, as seen in Fig. 7. A pair of holding pawls 146 are pivoted at 139 with their teeth also offset, and springs 147 connecting the dogs 142 and pawls 146 maintain their engagement with the teeth of the ratchet wheel 144. Thus as the pump piston 46 is reciprocated by the eccentric 120, the ratchet wheel 144 is turned in step-by-step fashion by one or the other of the ratchet dogs 142. As shown in Fig. 1 the shaft 145 carries a cam disc A, said cam being secured by screws 148 to a hub 149 (see Fig. 7) which is connected by pins 150 to a spur gear 151 rotatably mounted on the bushing 152 with which the shaft 145 is provided. The gear 151 meshes with the pinion 153 which is rigidly connected with a pinion 154, said pinions being journaled in a bearing eccentrically located in the ratchet wheel 144. As shown in Fig. 7 the gear 151 and pinion 153 are disposed at one side of the ratchet wheel 144, while the pinion 154 is disposed at the opposite side of the ratchet wheel and meshes with the gear 155 which is secured fixedly to the shaft 145 at that side of the wheel 144. The number of teeth of the gear 151 is slightly greater or slightly less than the number of teeth of the gear 155, preferably by a difference of a single tooth; or, as an alternative, the pinions 153 and 154 might differ by a single tooth, the gears 151 and 155 being exactly similar. In either case the rotation of the ratchet wheel 144 about the axis of shaft 145, causing the pinion 154 to travel around the fixed gear 155, produces a differential rotation of the gear 151 amounting to the angular width of one of its teeth for each rotation of the ratchet wheel 144. Thus the cam disc A connected to the gear 151 by pins 150 and screws 148 is rotated slowly as the pump continues to operate.

The cam disc A is arranged to actuate the slide valve 78 by means of a link 156 connected at one end to said valve by a pin 157 and having its opposite end formed as a yoke 158 which fits slidably over a reduced portion of the hub 149, as seen in Fig. 7. The link 156 carries a follower roller 159 which engages the periphery of the cam A and is maintained in such engagement by a spring 160 disposed in the pocket 161 threaded into the end of the casing 22 opposite the remote end of the valve member 78, as seen in Fig. 3. When the follower roller 159 engages the circular portion $x$ of the cam A, the valve member 78 will occupy its intermediate position in which it stands opposite the port 74, as shown in Fig. 9. When the high point $y$ of the cam A engages the roller 159, the valve 78 will be shifted to the left of said intermediate position and will occupy the position shown in Fig. 3 in which the port 74 is connected with the conduit 14. When the low point $z$ of the cam A engages the roller 159, the valve 78 will be shifted all the way to the right to a position in which the port 74 is connected for feeding lubricant into the conduit 16 and thence through the system.

Thus the gradual rotation of the cam A operates first to maintain the valve 78 in its middle or neutral position during the relatively extended interval between lubricating periods, and then to release lubricant through the system first in one direction and then in the other direction. The cam A may be rotated in either direction since it is immaterial whether lubricant is fed first into the conduit 14 and thence around the system to return by the conduit 16, or is first pumped out through the conduit 16 and returned through conduit 14.

The interval between lubricating periods may be varied by altering the stroke of the lever 138 and thus changing the angular movement of the ratchet wheel 144 effected at each reciprocation of the pump piston 46. This adjustment of the lever stroke is accomplished by means of a cam 162 which is rotatable through a limited angle on a pivot 163 fixed in a wall of the casing 22, as seen in Fig. 8. The cam is formed with abutment notches 164 which engage a pin 165'' fixed in the lever 138 and thus limit the stroke of the lever in response to its spring 141, this being the return or non-working stroke in which the teeth of the ratchet dogs 142 ride over the teeth of the ratchet wheel 144. The several notches 164 are disposed at different radial distances from the axis of the cam pivot 163 so that rotative adjustment of the cam 162 about its pivot alters the position at which the lever 138 is arrested. As seen in Fig. 8 the cam is provided with a sleeve 165 by which it is journaled on the pivot 163. The free end of the sleeve projects beyond the pivot bolt and has notches 165' for engagement with a cross pin 166 of an adjusting member 167 which is mounted for rotation, and packed against leakage, in a boss 168 in the front wall of the casing 22. This permits convenient removal of the front wall when necessary. The outer side of the boss is closed by a removable screw plug 169, giving access to the slotted head of the member 167 when it is desired to shift the cam 162 from one position to another. Said cam is formed with apertures 170 in which engages a spring pressed detent 170' for holding the cam in adjusted position.

Figure 10:
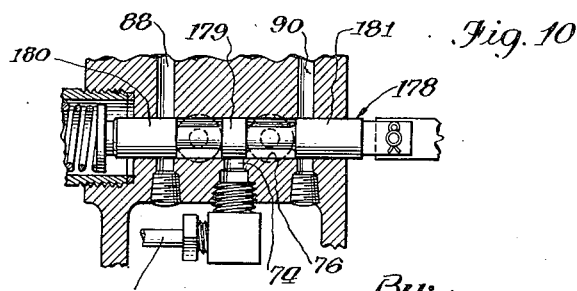
Fig. 10 is a fragmentary sectional view similar to Fig. 9, but showing a modified valve structure.

Figure 10 illustrates a modified form of valve member 178 in which the middle portion or land 179 is wide enough to fully close the feed port 74 when the valve stands at its middle position, and the end portions 180 and 181 are dimensioned to fully close the return passages 88 and 90 when the valve is in this position. If the pump runs continuously between lubricating periods this valve will cause the lubricant to be forced through the duct 64 into filter pocket 66, thence by passages 104 and 105 into port 106 and past the relief valve 108 into passage 102 which leads back to the reservoir 20. However, with this arrangement, the lubricating system outside the housing 22 would be sealed at both ends by the full closing of the valve 178 between the terminal conduits 14 and 16, and it would be necessary to install a separate relief valve in the system outside the housing 22, as a protection against possible damage which might occur if the lubricant thus confined in the system should expand with an increase of temperature during a shut-down period. In general, the form of valve shown at 78 in Figs. 3 and 9 is preferable, which not only serves to vent one line of a dual line system when the other line is connected to the pump, but vents both sides of the system to a low pressure region, such as the reservoir, when the system is inactive in the intervals between lubrication periods.

It will be understood that the compartment of the housing 22 which encloses the drive gearing and the timing mechanism contains a supply of oil for keeping these parts lubricated. An oil filler opening is closed by the screw plug 182; a removable plug 184 is positioned to determine the maximum oil level when the compartment is being filled; and a drain plug 186 at the level of the bottom wall permits cleaning out the used lubricant when necessary.

While there is shown and described herein certain structure embodying the invention and illustrative thereof, it should be understood that the invention is not limited thereto or thereby, but includes all modifications, variations and equivalents which may come within the scope of the appended claims.

I claim:

1. In a lubricating system having a conduit system with a feed and return line, a source of lubricant and a pump supplied from said source for supplying lubricant under pressure to said line, means for bypassing the lubricant discharged by said pump from said line, a single directional valve operable to direct the lubricant discharged by said pump alternately into opposite ends of said line for feeding lubricant in opposite directions through the system or to direct lubricant to said bypass means for discontinuing the flow of lubricant to said system, and timing means for positively operating said valve alternately to feed lubricant to said system and to discontinue feeding.

2. In a lubricating system of the type wherein a pump supplies lubricant intermittently to a feed line, a rotatable drive shaft, means for establishing a driving connection between said shaft and pump for operating said pump to discharge lubricant irrespective of the direction in which the shaft is rotated, valve means for controlling the flow of lubricant discharged by said pump, cam means for positively operating said valve, timing means for operating said cam means comprising a ratchet, gearing actuated upon rotation of said ratchet for driving said cam means, and means for rotating said ratchet in the same direction irrespective of the direction of rotation of said drive shaft including a lever pivoted to said pump mechanism, means cooperating with said pump driving means to rock said lever, a pawl mechanism reciprocated by said lever to rotate said ratchet, and adjustable means for determining the stroke of said lever independently of the operation of said pump driving means.

3. In a lubricating system having a lubricant conveying line, a source of lubricant and a pump supplied from said source for supplying lubricant under pressure from said source to said line, means for bypassing lubricant from said line, means for filtering the lubricant supplied to said line, a control valve for connecting said pump alternately with said bypass means and said line, timing means for positively operating said valve in a predetermined sequence to effect the alternate connection of said pump with said bypass means and said line, a second bypass means from said pump to said source around said filter means, a normally closed preloaded valve in said second bypass means yieldable when the resistance to flow through said filter means exceeds a predetermined maximum.

4. In a lubricant distributing system having a continuously driven reciprocating pump feed from a source of supply and valve means controlling connection of the pump with the system, a rotatable cam means for actuating said valve means, timing means for rotating said cam means including a rotatable ratchet wheel, pawl mechanism for rotating said ratchet wheel in one direction including a reciprocatory driving pawl adapted to rotate said ratchet wheel upon reciprocation in one direction and to ratchet upon said wheel upon reciprocation in the other direction, and a holding pawl adapted to ratchet on said wheel when the latter is rotated by said driving pawl and to prevent rotation thereof in the opposite direction, a lever member oscillated by the pump driving means for reciprocating said driving pawl, and a spring extending between said pawls and operative when one pawl ratchets to increase the holding power of the other pawl.

5. In a lubricating system having a lubricant distributing line and a driving means continuously operating a pump continuously to pump lubricant from a source of supply, a valve block having a valve chamber formed therein and passages leading to said chamber from the pump, from said chamber to opposite ends of said line, and from said chamber back to the supply, a single valve member shiftable in said chamber to connect either end of the line with the pump and simultaneously for substantially the same interval to connect the other end of the line with the supply or simultaneously to vent both ends of the line and the pump back to the supply, and means including a rotatable cam means for shifting said valve member to connect the pump first with one line, then with the other line, and then with said vent, and step-by-step driving means actuated by the pump driving means to rotate said cam.

6. In a lubricating system having a lubricant distributing line and a driving means continuously operating a pump continuously to pump lubricant from a source of supply, means forming a valve chamber with passages leading to said chamber from the pump, from said chamber to both ends of the line, and from said chamber back to the supply, a single valve member shiftable in said chamber to connect either end of the line with the pump and simultaneously and for substantially the same interval to connect the other end of the line with the supply or simultaneously to vent both ends of the line and direct lubricant from the pump back to the supply, and a mechanical timing device operated by movement of said pump and connected to shift said valve member at predetermined intervals to its several operative positions in a predetermined order.

7. In a lubricating system having a lubricant distributing line and a driving means continuously operating a pump continuously to pump lubricant from a source of supply, means forming a valve chamber with passages leading to said chamber from the pump, from said chamber to both ends of the line, and from said chamber back to the supply, a single valve member shiftable to different positions in said chamber to connect either end of the line with the pump and simultaneously for substantially the same interval to connect the other end of the line with the supply or to direct the entire output of the pump back to the supply, a rotatable cam formed to shift said valve member to its different positions in accordance with a predetermined cycle, and speed reducing gearing operatively connecting said cam with said pump.

8. In a lubricating system having a lubricant distributing line and a driving means continuously operating a pump continuously to pump lubricant from a source of supply, means forming a valve chamber with passages leading to said chamber from the pump, from said chamber to both ends of the line, and from said chamber back to the supply, a single valve member shiftable to different positions in said chamber to connect either end of the line with the pump and simultaneously for substantially the same interval to connect the other end of the line with the supply or to direct the entire output of the pump back to the supply, a rotatable cam for shifting said valve member to its different positions in accordance with a predetermined cycle, means driven by said pump driving means for rotating said cam including epicyclic gearing, and means for varying the rate of rotation of said gearing independently of the speed of operation of said pump driving means to vary the period of a cycle.

9. In a lubricating system having a lubricant distributing line and a continuously operating pump for supplying lubricant to the line from a source of supply, means for bypassing from said line the lubricant discharged by said pump, a single control valve for connecting said pump with either end of the line for directing a flow of lubricant in opposite directions through the line or for connecting both ends of the line and the pump with said bypass means for discontinuing flow of lubricant through the system, and timing means for positively operating said valve alternately to feed lubricant to said system and to discontinue feeding.

10. In a lubricating system of the type wherein a power driven pump continuously supplies lubricant from a source to a line or to a bypass back to the supply under the control of a valve, means positively to operate said valve for connecting said pump with said line or with said bypass at predetermined intervals and for predetermined periods, comprising a cam, means including a ratchet to operate said cam, means to operate said ratchet including a lever, means including a lost motion connection between the operating mechanism for said pump and said lever for rocking the latter and a pawl operated by said lever to advance said ratchet, and means to vary the lost motion between said pump operating mechanism and lever thereby to vary the period of a cycle of operation of the valve.

11. In a lubricating system of the type wherein a power driven pump continuously supplies lubricant from a source to a line or to a bypass back to the supply under the control of a valve, means positively to operate said valve for connecting said pump with said line or with said bypass at predetermined intervals and for predetermined periods, comprising a cam, means including a ratchet to operate said cam, means to operate said ratchet including a rockable lever, yieldable means to bias said lever in one direction, a loose connection between the lever and the operating mechanism for said pump effective to move said lever in the opposite direction when the pump is operated and a pawl operated by said lever to advance said ratchet, and cooperating stops on said lever and a fixed part of said mechanism to limit movement of the lever under the influence of said yieldable means, said stops being relatively adjustable to vary the limits of the stroke of said lever and thereby to vary the amount said ratchet is advanced during each stroke of the pump.

12. In a lubricating system of the type wherein a power driven pump continuously supplies lubricant from a source to a line or to a bypass back to the supply under the control of a valve, means positively to operate said valve for connecting said pump with said line or with said bypass at predetermined intervals and for predetermined periods, comprising cam means for positively operating said valve, a ratchet and pawl mechanism operated by said pump operating mechanism, an epicyclic gearing including a fixed gear, a gear operatively connected for driving said cam means, and pinion means rotatably carried by said ratchet and engaged with said fixed gear so as to be rotated upon its own axis when the ratchet is advanced and engaged with said cam driving gear simultaneously to advance the same.

13. In a lubricating system of the type wherein a power driven pump continuously supplies lubricant from a source to a line or to a bypass back to the supply under the control of a valve, means positively to operate said valve for connecting said pump with said line or with said bypass at predetermined intervals and for predetermined periods, comprising cam means for positively operating said valve, cam operating means including a ratchet, epicyclic gearing actuated by said ratchet upon rotation thereof for driving said cam means and means for rotating said ratchet including a pawl mechanism connected to operate in unison with said pump, and means independent of said pump for regulating the stroke of said pawl mechanism.

14. In a lubricating system of the type wherein a power driven pump continuously supplies lubricant from a source to a line or to a bypass back to the supply under the control of a valve, means positively to operate said valve for connecting said pump with said line or with said bypass at predetermined intervals and for predetermined periods, comprising cam means for positively operating said valve means, and cam operating means comprising a ratchet, epicyclic gearing driven by said ratchet and operatively connected for driving said cam means, a pawl mechanism for rotating said ratchet, a rockable lever member for operating said pawl mechanism, means to establish a connection between said lever and the operating mechanism for said pump to rock the lever in one direction, means for rocking said lever in the opposite direction, and means to limit movement of the lever in the latter direction to vary the stroke of said pawl mechanism and thereby to vary the speed of rotation of the ratchet and the cam driven thereby.

15. In a lubricating apparatus including a continuously operating pump for pumping lubricant from a source intermittently to the opposite ends of a lubricant distributing line, the combination comprising a valve block having a valve chamber formed therein, said valve chamber having an inlet port communicating with said pump, a pair of alternate discharge and return ports, means for returning the lubricant pumped by said pump to said source of supply including a bypass port in said valve chamber, a single piston valve reciprocable in said chamber having a plurality of passage forming means, one of said passage forming means cooperating with said valve chamber at one position of the valve to connect said inlet port to one of said discharge ports and at the same position of the valve a second of said passage forming means cooperating with said valve chamber to connect the second discharge port to said bypass port for directing lubricant in one direction from the valve chamber, at another position of the valve the second passage forming means connecting said inlet port to the second discharge port and the first passage forming means connecting said first discharge port to the bypass port for directing lubricant in the opposite direction from said valve chamber, said passage forming means at a third position of the valve cooperating with said valve chamber and the ports therein to discontinue the flow of lubricant to the discharge ports and cause the same to be returned to said source of supply, and timing mechanism to move said valve between said positions in a predetermined order and at predetermined intervals.

16. In a lubricating apparatus including a continuously operating pump for pumping lubricant from a source intermittently to the opposite ends of a lubricant distributing line, the combination comprising a valve block having a valve chamber formed therein, said valve chamber having an inlet port communicating with said pump, a pair of alternate discharge and return ports, and a bypass port communicating with the source of supply, a single piston valve reciprocable in said chamber having a plurality of passage forming means, one of said passage forming means cooperating with said valve chamber at one position of the valve to connect said inlet port to one of said discharge ports and at the same position of the valve a second of said passage forming means cooperating with said valve chamber to connect the second discharge port to said bypass port for directing lubricant in one direction from the valve chamber, at another position of the valve the second passage forming means connecting said inlet port to the second discharge port and the first passage forming means connecting said first discharge port to said bypass port for directing lubricant in the opposite direction from said valve chamber, said passage forming means at a third position of the valve cooperating with said valve chamber and the ports therein to connect both discharge ports and said inlet to the bypass port, and timing mechanism to move said valve between said positions in a predetermined order and at predetermined intervals.

17. In a lubricating apparatus including a continuously operating pump for pumping lubricant from a source intermittently to the opposite ends of a lubricant distributing line, the combination comprising a valve block having a valve chamber formed therein, said valve chamber having an inlet port communicating with said pump, a pair of alternate discharge and return ports, and a bypass port communicating with the source of supply, a single piston valve reciprocable in said chamber having a plurality of passage forming means, one of said passage forming means cooperating with said valve chamber at one position of the valve to connect said inlet port to one of said discharge ports and at the same position of the valve a second of said passage forming means cooperating with said valve chamber to connect the second discharge port to said bypass port for directing lubricant in one direction from the valve chamber, at another position of the valve the second passage forming means connecting said inlet port to the second discharge port and the first passage forming means connecting said first discharge port to said bypass port for directing lubricant in the opposite direction from said valve chamber, said valve at a third position to which it is movable closing said inlet port, timing mechanism to move said valve between said positions in a predetermined order and at predetermined intervals, and a check valved bypass means in said valve block connecting the pump and the source of lubricant for returning lubricant to said source when said valve is in the third position.

HARRY R. TEAR.

REFERENCES CITED

The following references are of record in the file of this patent:

UNITED STATES PATENTS

| Number | Name | Date |
|---|---|---|
| 1,825,973 | Murphy | Oct. 6, 1931 |
| 1,919,118 | Millington | July 18, 1933 |
| 2,063,903 | Bijur | Dec. 15, 1936 |
| 2,068,391 | Acker | Jan. 19, 1937 |
| 2,075,719 | Hillis | Mar. 30, 1937 |
| 2,260,497 | Whitted | Oct. 28, 1941 |
| 2,353,734 | Kocher | July 18, 1944 |

FOREIGN PATENTS

| Number | Country | Date |
|---|---|---|
| 4,955 | Great Britain | 1907 |